United States Patent [19]

Abel

[11] Patent Number: 4,497,477

[45] Date of Patent: Feb. 5, 1985

[54] APPARATUS FOR CUTTING GLASS INTO VARIOUS SHAPES

[75] Inventor: Donald Abel, Morton, Ill.

[73] Assignee: Morton Glass Works, Morton, Ill.

[21] Appl. No.: 318,450

[22] Filed: Nov. 5, 1981

Related U.S. Application Data

[63] Continuation-in-part of Ser. No. 201,718, Oct. 29, 1980, abandoned.

[51] Int. Cl.³ .............................................. B25B 1/08
[52] U.S. Cl. .................................. 269/303; 269/315; 269/900
[58] Field of Search ...................... 83/467 R, 767, 761, 83/648; 33/32 R, 32 B, 32 C, 430, 434, 184.5; 269/303–306, 315, 97, 900; 428/116; 217/26.5, 60 R, 60 A, 60 T, 69, 74

[56] References Cited

U.S. PATENT DOCUMENTS

| | | | |
|---|---|---|---|
| 1,357,474 | 11/1920 | Remsberg | 33/430 |
| 1,954,708 | 4/1934 | Mass | 269/900 |
| 2,058,091 | 10/1936 | Marsella et al. | |
| 2,061,569 | 11/1936 | Fischer | 428/116 |
| 2,268,637 | 1/1942 | Bernstein | 428/116 |
| 2,272,227 | 2/1942 | Thomas | 428/116 |
| 2,273,716 | 2/1942 | Louviaux et al. | |
| 2,578,919 | 12/1951 | Bowers | |
| 2,595,079 | 4/1952 | Itaya | |
| 2,812,579 | 11/1957 | Arck | |
| 2,845,713 | 8/1958 | Macaulay | |
| 2,964,848 | 12/1960 | Gonsalves | |
| 3,124,181 | 3/1964 | Clemans | 269/315 |
| 3,227,016 | 1/1966 | Moeller | |
| 3,848,495 | 11/1974 | Youra | 269/305 |
| 3,903,767 | 9/1975 | Kupersmith | |
| 4,119,305 | 10/1978 | Anderson | 269/97 |
| 4,120,220 | 10/1978 | Mullen | |
| 4,157,819 | 6/1979 | Meyer | 269/303 |

FOREIGN PATENT DOCUMENTS 257349  10/1948  Switzerland ..................... 269/302.1

Primary Examiner—Robert C. Watson
Attorney, Agent, or Firm—Bacon & Thomas

[57] ABSTRACT

The invention comprises a device for supporting a piece of glass while cutting same by scoring and subsequently breaking it along the score line. The device includes a plurality of generally vertically oriented intersecting walls having upper and lower edges, the upper edges of the walls being coplanar so as to define a planar supporting surface for the glass piece and a generally horizontal base attached to the lower edge of each of the walls such that the walls and base form a plurality of upwardly opening pockets to catch and retain glass chips generated by the scoring and breaking process. A variety of stop devices both adjustable and non-adjustable may be inserted into the pockets to act as straight edges or stops for positioning the glass.

23 Claims, 16 Drawing Figures

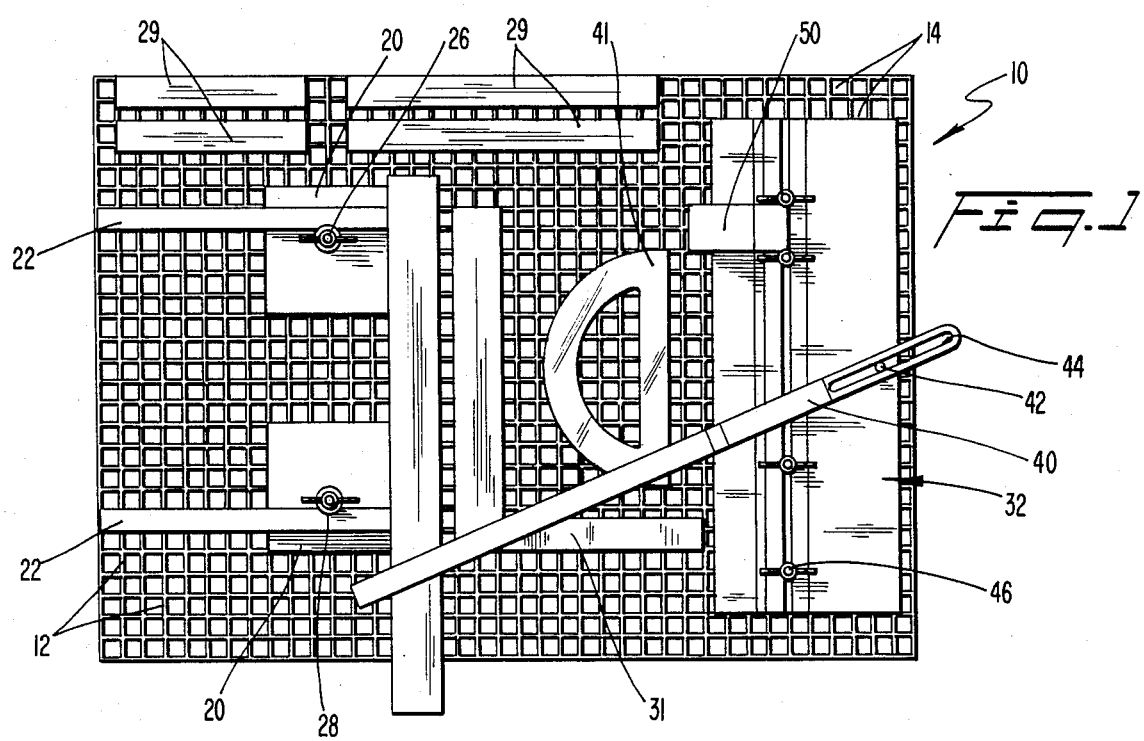
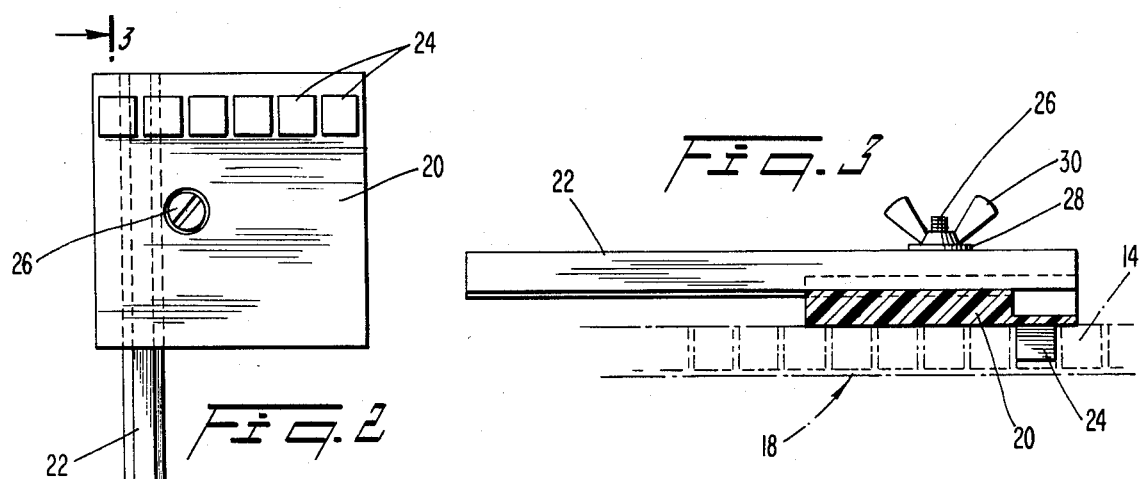
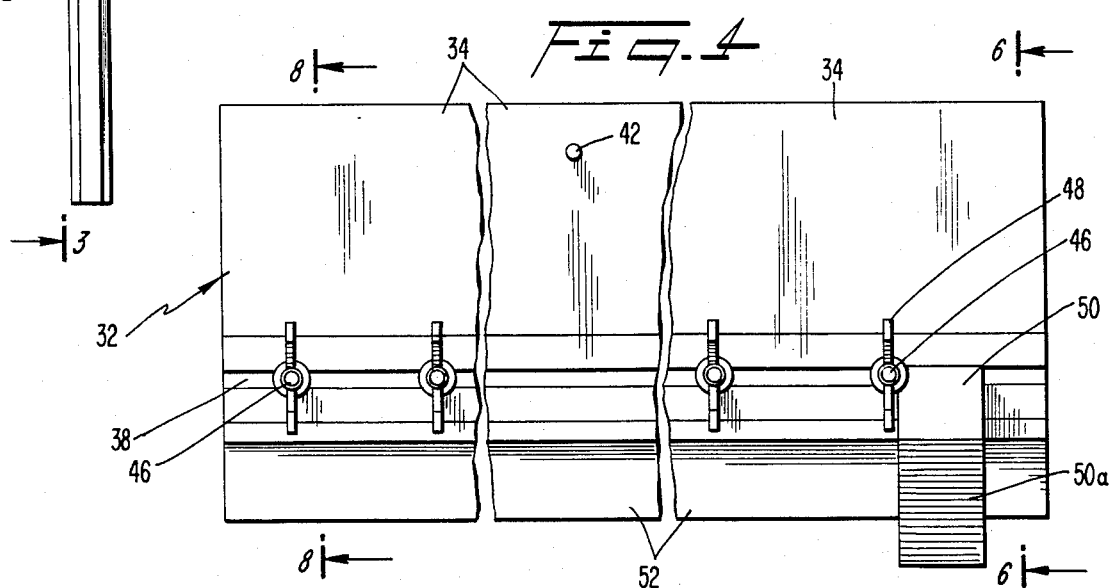

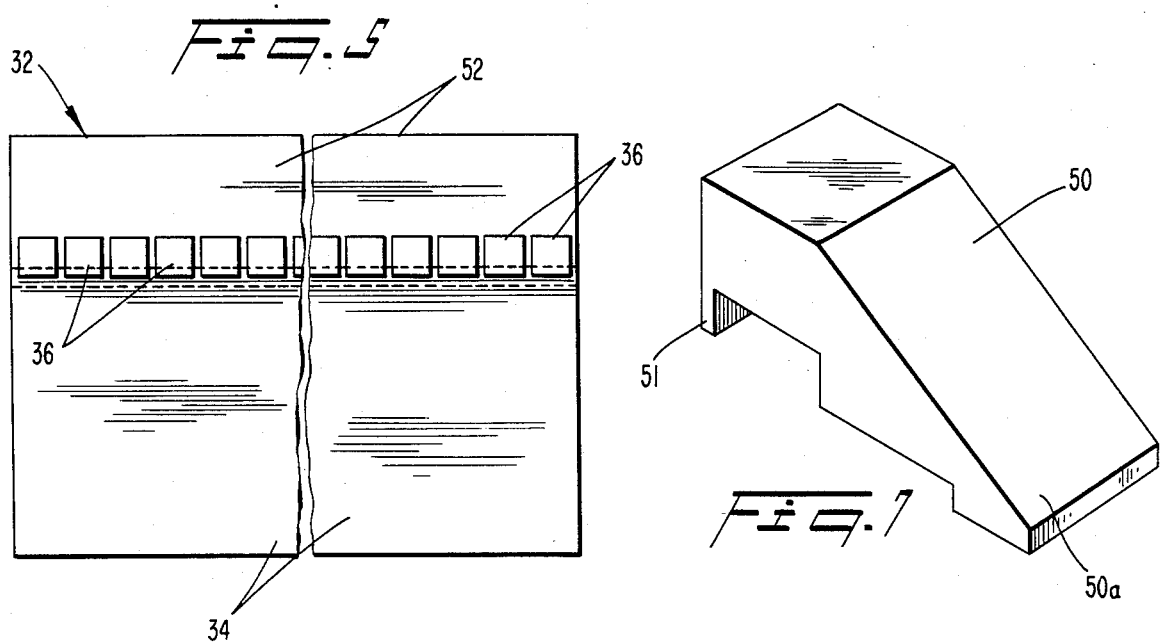
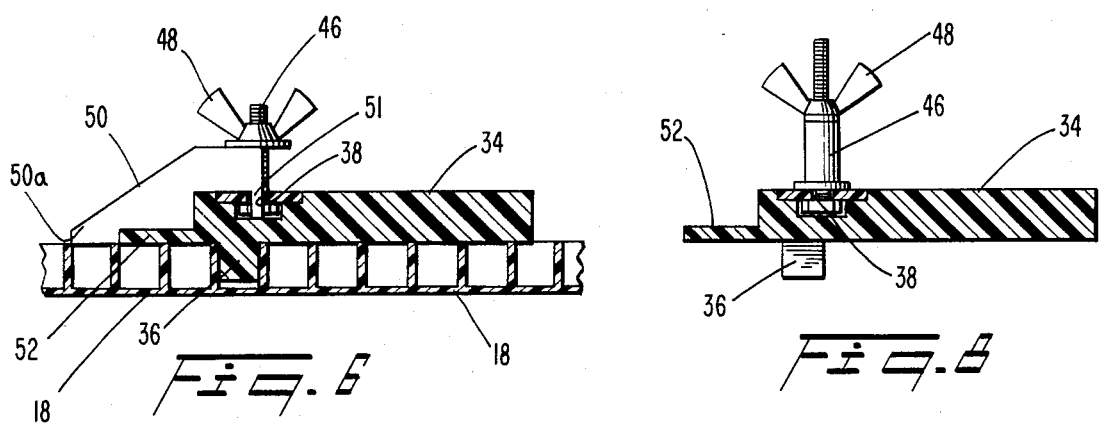
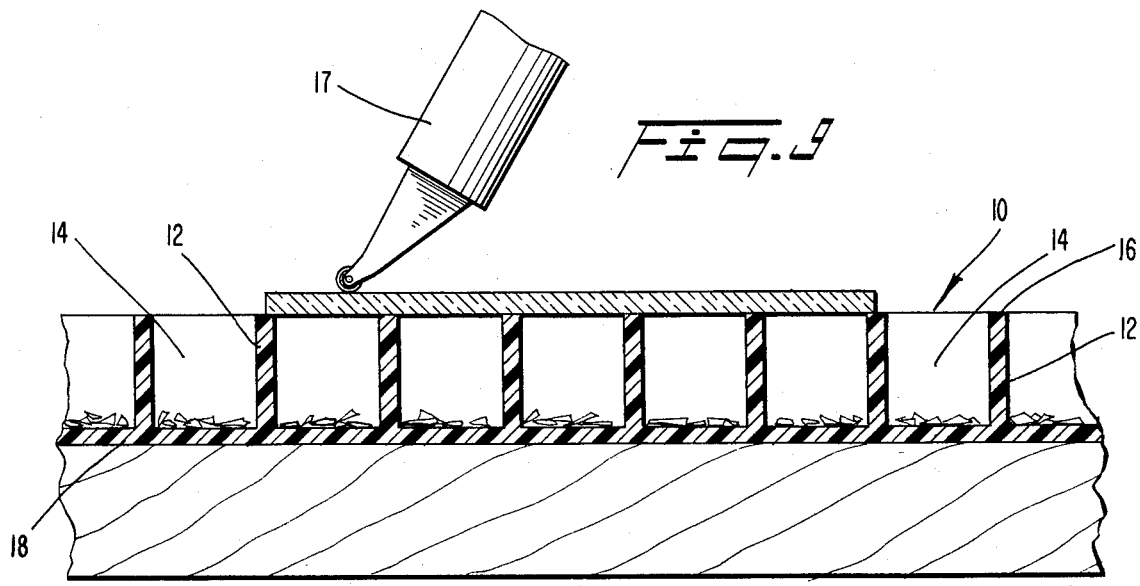

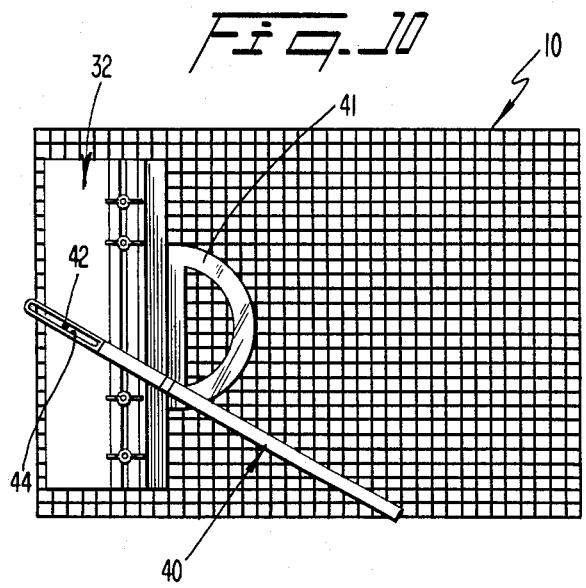
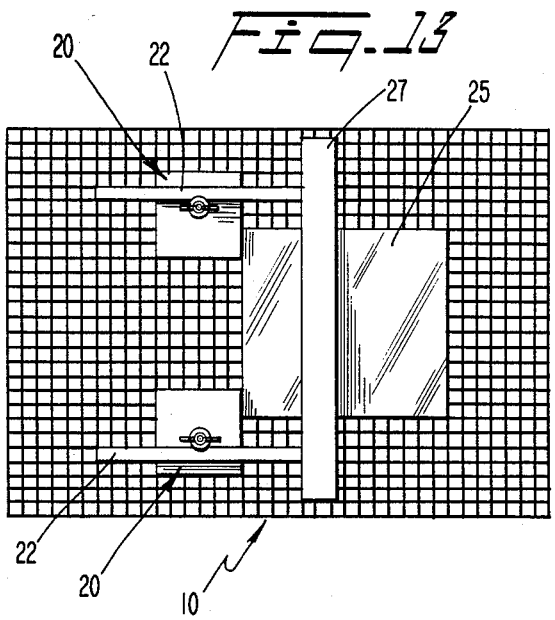
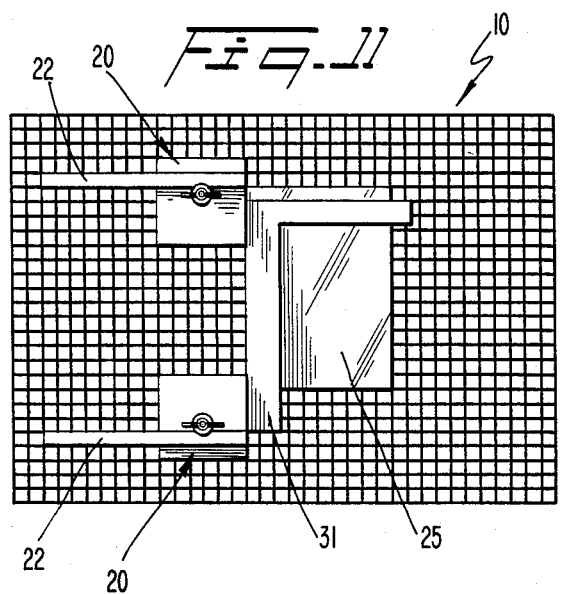
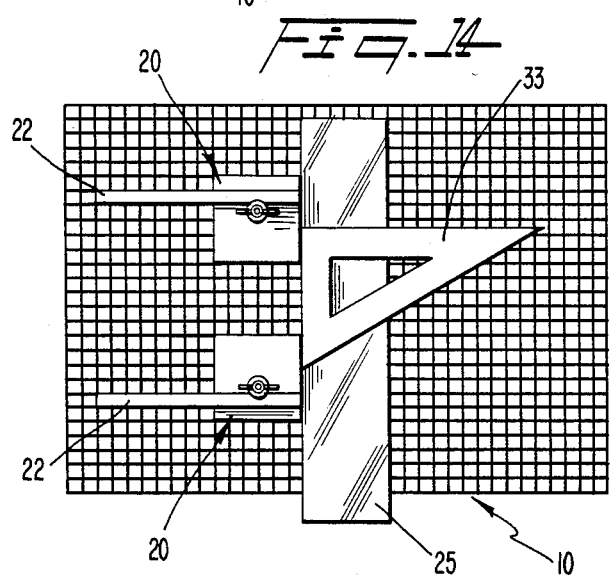
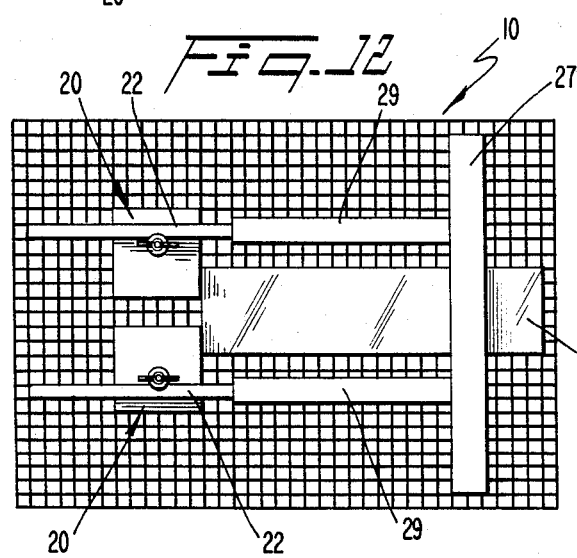
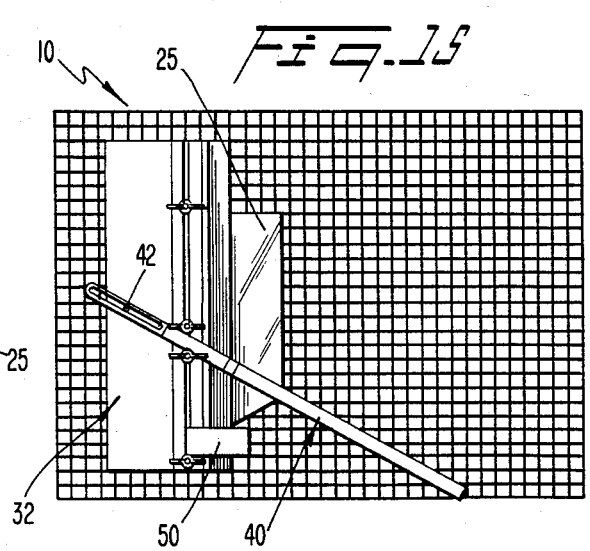

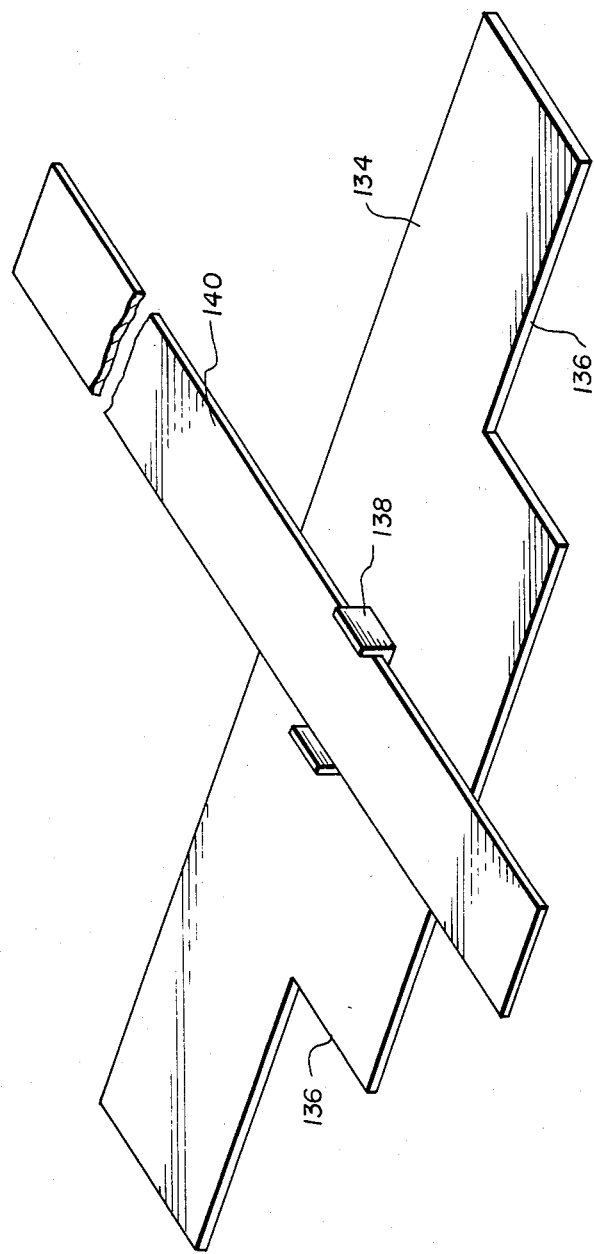

APPARATUS FOR CUTTING GLASS INTO VARIOUS SHAPES

FIELD OF THE INVENTION

This invention is a continuation-in-part of Ser. No. 201,718 of the same title filed on Oct. 29, 1980, now abandoned and relates to glass cutting apparatus, more particularly an apparatus for cutting glass into various intricate shapes such as those used in stained glass art works.

BRIEF DESCRIPTION OF THE PRIOR ART

The technique of cutting glass by scoring the surface and subsequently breaking it at the score mark has, of course, been known for many years. Over the years, numerous accessories have been developed to assist the operator in effectuating this glass cutting process. Among these have been tables having specific surfaces thereon to facilitate the glass cutting operation without scratching the glass surface, guide elements to guide the cutting tool to accurately cut the glass in a straight line, and devices to enable the user to cut small, odd-shaped pieces of glass.

Typical of this latter category of devices is the apparatus shown in the Mullen patent (U.S. Pat. No. 4,120,220). This apparatus enables a user to cut odd-shaped pieces of glass by disposing a glass cutter in a retaining arm over a work table such that the operator may use both hands to manipulate the glass piece. Alternatively, the glass piece may be secured to the cutting surface and the entire cutting arm moved if the operator so desires. However, this typical apparatus suffers a serious drawback that is shared by virtually all of the prior art devices intended for the home/hobbyist user, that is the collection of glass chips generated by the glass cutter on the work table surface. These chips may cause scratching of the glass surface, injury to the hands of the user, and almost certain inconvenience by the requirement to constantly clean the work table. It is noted that the aforementioned Mullen patent does not address this issue, nor does it propose any kind of solution.

The problem of glass chips scratching the surface of the glass that is being cut has long been recognized in commercial glass cutting operations and several solutions have been put forth (see U.S. Pat. Nos. 2,578,919; 2,595,079; and 2,273,716). These solutions have generally involved placing a plurality of longitudinal ridges on the top of the glass cutting table such that the glass pane being cut rests on the top of the ridges and the glass chips fall between the ridges. In the field of commercial glass cutting operations, which generally cuts panes of glass of relatively large size for windows, doors, picture frames, etc., this solution has been perfectly acceptable. However, for the home/hobbyist user these devices are, in fact, no solution whatsoever. The home/hobbyist user has substantially different criteria for cutting relatively small, irregularly shaped pieces of glass for art works than does the commercial business establishment which cuts almost solely rectangular, rather large glass panes. The prior art solutions mentioned above achieve their affect through a table structure having attached thereto, or integrally formed therewith, the plurality of parallel ridges to collect the glass chips. Obviously, for a home user who must often pursue his hobby without benefit of a separate workshop area, a complete table structure having no other use than for cutting glass is not practical. Furthermore, the hobbyist user must cut various small pieces of glass into highly irregular shapes, which is not possible on glass cutting surfaces utilizing a plurality of longitudinal ridges. Even if the ridges were spaced closely enough together to support the glads while being cut, the irregular shapes encountered by the hobbyist user would invariably require a cut parallel to the support ridges. Obviously, this would cause a breakage of the glass if too much pressure on the cutting tool were exerted, and insufficient scoring of the glass if too little pressure were exerted.

One prior art device attaches a surface of rubber having parallel ridges on its cutting side which supports the glass pane. This is also of no benefit to the home/hobbyist user, since the rubber surface with the ridges will deform if cutting small pieces of glass, thereby rendering the accurate cutting of irregular small pieces impossible.

The prior art is also replete with devices for guiding a glass cutter along a particular path. These have primarily involved guide bars or other devices permanently attached to a cutting surface along edges disposed at right angles to each other. Once again, these are primarily used in commercial glass cutting establishments to accurately and repeatedly cut rectangular, relatively large panes of glass. They are of particular import in this type of establishment since it enables the operator to rapidly cut a straight line over a large area. Some of these prior art devices are adjustable to readily enable the operator to cut rectangular glass panes of various sizes. However important these devices may be to the commercial business establishment, they are of virtually no use to the home/hobbyist user. As stated previously, the fabrication of glass art works requires the cutting of relatively small pieces of glass and often cutting them into irregular, curved shapes. These prior art devices require the placement of one corner of the glass at the intersection of the orthogonal guiding devices which is often located at one corner of the cutting table. When cutting pieces of relatively small size this is, at best, highly inconvenient to the user and, more often than not, renders the cutting of irregular shapes virtually impossible.

Thus, the known prior art has not addressed itself to providing the home/hobbyist user with an apparatus that will enable him to cut relatively small pieces of glass, often of irregular shapes, within his normal place of residence without encountering the difficulties of potentially hazardous glass chips.

SUMMARY OF THE INVENTION

The present invention obviates the aforementioned shortcomings of the prior art devices and provides a glass cutting surface that is clean, safe, and readily portable. The surface is provided on a base structure that is made of styrene plastic or similar material and comprises an egg crate cutting surface. The upwardly opening pockets or indentations formed by the egg crate cutting surface allows the glass chips generated by the operation to fall below the cutting plane so as to prevent scratching of the surface of the glass. The dimensions of the pockets are sufficiently small such that they are smaller than the smallest piece of glass needed to be cut. Thus, the surface provides full support for cutting relatively small pieces of glass into various irregular shapes. The base comprises a lower surface which may be of a non-skid material to enable the home/hobbyist user to place the base on any existing desk, table or the like without the fear of marring the surface. Due to the egg crate design, the user may cut in any direction without moving the glass and be assured that the glass piece will be fully supported.

The instant invention also provides a variety of stop devices, both adjustable and non-adjustable, which may be inserted into the egg crate pockets to act as straight edges or stops for positioning the glass. These devices may include adjustable cutter bar blocks, each having an adjustable arm thereon so as to enable the positioning of a straight edge or other cutter guide at any location on the glass surface. Also, a variable angle cutting jig may be inserted into the egg crate pockets to enable the user to cut glass at any desired angle. The variable angle cutting jig comprises a slotted cutter bar that is pivotally attached to a cutting jig base having projections on its lower surface which engage the egg crate pockets. Slidable stops are provided on this cutting jig base at a point displaced from the pivot point such that the cutter bar may be adjusted to any angle relative to the cutting jig base. Adjustable stop blocks are also slidably engaged with the cutting jig base to provide a lateral stop for the glass piece. Since the cutting jig base engages the egg crate pockets, it may be placed at any location or orientation on the cutting surface that is convenient to the user. A protractor may be utilized to measure the angle of the cutter bar, or a protractor may be provided on the cutting jig base.

BRIEF DESCRIPTION OF THE DRAWINGS

FIG. 1 is a top view of the apparatus according to the invention;

FIG. 2 is a bottom view of the adjustable cutting block according to the invention;

FIG. 3 is a cross-sectional view of the adjustable cutting block taken along lines 3—3 in FIG. 2;

FIG. 4 is a top view of the cutting jig base and adjustable stops according to the invention;

FIG. 5 is a bottom view of the cutting jig base shown in FIG. 4;

FIG. 6 is a cross-sectional view of the cutting jig base taken along lines 6—6 in FIG. 4;

FIG. 7 is a perspective view of the adjustable stop block according to the invention;

FIG. 8 is a cross-sectional view of the adjustable jig base according to the invention taken along lines 7—7 in FIG. 4;

FIG. 9 is a partial view of the cross-section of the base according to the invention;

FIGS. 10-15 is a series of top views of the apparatus according to the invention showing the various positions of the adjustable stop blocks, adjustable jig base and accessories; and FIG. 16 is a perspective view of an alternative embodiment according to the invention.

DETAILED DESCRIPTION OF THE PREFERRED EMBODIMENT

The cutting surface according to the present invention comprises a base 10 having a plurality of generally vertically oriented walls 12 inter-engaging so as to form a plurality of pockets or indentations 14. Although the walls are shown as forming square pockets, the pockets may be of any cross-sectional shape as long as the dimensions between the walls of the pockets are smaller than the smallest piece of glass to be cut on the surface.

The uppermost edges 16 of the walls form a plane on which the glass is cut with a standard scoring type cutting tool 17. As noted previously, the scoring process generates minute chips of glass which may fall down into the pockets when the glass is broken along the score line. The depth of the pockets is of some sufficient dimension to allow several cuttings on the surface before it becomes necessary to empty the glass chips. Permitting the glass chips to fall into the pockets below the cutting plane prevents scratching of subsequent glass placed on the cutting surface; prevents possible injury to the user; and eliminates the necessity of manually cleaning the cutting surface after every cutting operation.

The walls 12 may be formed (by a molding process or the like) of a rigid plastic material, such as styrene plastic, although any other material will suffice as long as it is rigid enough to provide adequate support, but soft so as not to scratch the glass surface. It is envisioned in that the lateral dimensions of the pockets will be approximately ½ inch square and the depth will also be approximately ½ inch. The overall size of the board will vary, of course, according to the use to which it is put, but an overall dimension of 24 inches by 36 inches is believed to provide a sufficient cutting area for most home/hobbyist users. Obviously the dimensions are not critical to the functioning of the device and others may be substituted without going beyond the scope of this invention.

The walls 12 may either be formed with a lower surface of the same material to provide a base for each of the pockets, or the walls may be attached to another layer 18 formed of a non-skid material. The non-skid surface will enable the user to place the base 19 on any convenient horizontal surface, such as a desk or table, without fear of marring its surface.

Cutting pieces of glass to form glass art works involves free hand cutting and, if such is the case, a scoring tool and the aforementioned base are all that are required. However, it is at times necessary to cut glass into squares, rectangles, or other polygonal shapes. This operation requires a guide for the glass cutting tool as well as a stop against which the glass may be placed. This function is readily achieved by adjustable cutting block 20 having an adjustable arm 22 slidably retained therein. Adjustable cutting block 20 has a plurality of projections 24 on its lower surface, the cross-sectional shape of projections 24 corresponding to the shape of the pockets 14 in base 10. The inter-engagement of the projections 24 with the pockets 14 provide a stable stop against which the glass may be placed at any desired position or orientation on the base 10. Adjustable arm 22 may be retained in any adjusted position by way of carriage bolt 26, which extends upwardly through the cutting block 20, washer 28 and wing nut 30. To adjust the arm, the wing nut 30 is loosened, the arm 22 is manually placed in its desired position, and the wing nut is tightened so as to force washer 28 down onto the arm and thereby retain it in position. If desired, a scale may be placed on the upper surface of the cutting block 20 and the adjustable arm 22 so as to enable the user to adjust the arm to a given dimension without utilizing a separate measuring device.

When it is desired to cut a straight line on the glass, two of the adjustable cutting blocks are placed onto the base 10 and their adjustable arms are suitably adjusted. The glass 25 is then placed against the cutting blocks and a straight edge 27 is placed against both of the adjustable arms as shown in FIG. 13. The glass cutting tool can then be drawn along the straight edge 27 to effect the requisite score mark. The glass 25 is then removed from the board and broken along the score line as is well-known in the prior art.

Angled cuts may be also made by using two of the adjustable cutting blocks as described above, but instead of adjusting the slidable arms 22 to the same dimension away from the block, the arms are adjusted to different lengths. A straight edge is again placed against the arms to enable the operator to draw the glass cutting tool along the straight edge to make a score line at an angle to the base edge of the glass which is placed against the cutting blocks 20.

Should it be desired to cut the glass to a dimension larger than the length of adjustable arms 22, the arms 22 are adjusted to a specified position and blocks 29 of known dimensions are placed against their ends as shown in FIG. 12. The straight edge 27 is placed against the distal ends of the blocks to enable the operator to effect the glass scoring line.

Similarly, two adjustable blocks 20 may be used as a base for making cuts of virtually any angle by using a standard drafting square 31 or triangle 33, as shown in FIGS. 11 and 14, respectively. The edge of the glass 25 and the base of the instrument utilized are placed against the blocks to form a rigid stop surface. The glass cutting tool (not shown) is drawn along the edge of the instrument to form the requisite score line.

To enable the operator to cut any angle he so desires, a variable angle cutting jig assembly 32 may also be provided. This assembly comprises a base 34 having a plurality of projections 36 extending from its lower surface to engage pockets 14 on base 10. As in the case of the projections 24 on adjustable cutting blocks 20, the projections 36 enable the operator to place cutting jig assembly base 34 in any position on base 10 that he so desires. Base 34 has longitudinal, inverted "T"-shaped slot 38 extending along its length. A cutting guide bar 40 is pivotally attached to the central portion of cutting jig base 34, such as by engagement of upstanding pin 42 with slot 44 in the guide bar 40. Any other method of pivotally attaching cutting guide bar 40 to cutting jig base 34 may also be utilized without exceeding the scope of this invention.

A plurality of adjustable stops 46 are engaged in "T" slot 38 and may be manually adjusted and fixed in any position by loosening and tightening wing nut 48. These stops bear against the lateral edges of cutting guide bar 40 to enable the user to adjust it to any angle in relationship to the cutting jig base 34. The angle may be adjusted by using a separate protractor or 41, in the alternative, a built-in protractor may be provided on cutting jig base 34.

An adjustable stop block 50 is also provided with the variable angle cutting jig assembly 32 to provide a lateral stop for the glass piece. Stop block 50 has a depending flange 51 that fits into inverted "T" slot 38 and is dimensioned such that its forwardmost portion 50a extends beyond the forwardmost portion of flange 52 of cutting jig base 34. Stop block 50 is maintained in position by bearing against one of the adjustable stops 46. In order to cut a piece of glass at a desired angle, the glass 24 is first placed against the edge of flange 52 and adjustable stop block 50 to prevent its movement as shown in FIG. 15. Once the glass piece 25 is located, the cutting guide bar 40 is placed in its proper position, either by the use of an external protractor 41 or a built-in protractor and is locked in position by adjustable stops 46. Once the cutting guide bar is thusly placed in position, the operator may draw the glass cutting tool over the glass surface using guide bar 40 as a straight edge. The height of flange 52 is somewhat less than the thickness of the glass to enable the operator to draw the glass cutting tool completely across the glass piece without interruptions. Adjustable stop block 50 may be readily moved to the opposite side of cutting jig base 34 and locked in position to facilitate cutting the glass at an opposite angle to that previously described. The use of an adjustable stop that is readily positionable both to the left and right of the center of cutting jig base 34 is particularly worthwhile to the hobbyist since the glass used in many lamps or other art works can only be cut on one side. Thus, once the stops 46 are positioned the operator can readily make score lines both to the left and to the right of the center of cutting jig base 34 without having to turn the glass over.

This invention also envisions a kit containing the above-identified elements which could be sold to the home/hobbyist user interested in making his own art glass works. It would enable him to cut virtually any shape of relatively small glass pieces in his own home on existing tables or desks without fear of damaging these articles, or without fear of incurring injury due to glass chips being present on the work surface or falling to the floor. The kit would include, of course, a base having the egg crate surface as previously described, and a pair of cutting blocks 20. The kit may also include one or more pairs of spacer blocks 29 of known dimensions which may be utilized in conjunction with the adjustable arm 22 of the cutting blocks 20 to cut various sizes of glass. Also, the kit may include the variable angle cutting jig assembly 34 as previously described.

As an alternative embodiment, the cutting jig assembly may take the form of flat base 134 as shown in FIG. 16. Base 134 is formed of flat material such as metal, plastic, or the like, having parallel longitudinal edges and notched cutouts 136 adjacent each end. Swivel yoke 138 is pivotally attached to base 134 at approximately its midpoint and serves as a locator for guide bar 140 which slidingly engages the yoke. Base 134 is fixedly located on base 10 by placing one or more adjustable cutting blocks 20 against one or more of its peripheral edges. Cutting blocks 20 may be located in one or more of the notched cutouts 136 to positively locate the base during use. Once the base is positioned, the operator can adjust guide bar 140 to its desired position and can be maintained in this position by manual effort of the operator, or by engagement of further guide blocks 20. The use of guide blocks 20 to position the base and the guide bar obviates the need for any projections on base 134 thereby enabling it to be more easily produced. The yoke may be attached to base 134 by any known means which would allow it to readily pivot with respect to the base.

The foregoing provides a description of the preferred embodiment of this invention and is not to be construed as limiting its scope, which is solely defined by the appended claims.

I claim:

1. A device for supporting a piece of glass while cutting same by scoring and subsequently breaking it along the score line comprising: a plurality of generally vertically oriented intersecting walls having upper and lower edges, the upper edges of the walls being coplanar so as to define a planar supporting surface for said glass piece and a generally horizontal base attached to the lower edge of each of the walls such that the walls and base form a plurality of upwardly opening pockets to catch and retain glass chips generated by the scoring and breaking process below the planar supporting surface; a variable angle cutting jig base having a plurality of projections projecting from its lower surface to engage said upwardly opening pockets; a cutting guide bar pivotally attached to said variable angle cutting jig base; and, an adjustable stop block slidably retained on said variable angle cutting jig base so as to act as a lateral stop for the glass piece.

2. The device of claim 1 further comprising at least one adjustable cutting block against which the glass may be placed during the scoring operation, said cutting block having a plurality of projections on its lower surface to engage said upwardly opening pockets.

3. The device of claim 1 wherein said walls are formed of a plastic material.

4. The device of claim 1 further comprising a non-skid material attached to an exposed surface of the base.

5. The device of claim 2 wherein each of said pockets has a polygonal cross-section.

6. The device of claim 2 further comprising an adjustable arm slidably attached to said adjustable cutting block, said arm being slidably adjustable in a direction generally parallel to the plane of said supporting surface, and means on said adjustable cutting block to lock said adjustable arm in a desired position.

7. The device of claim 1 wherein said projections have the same cross-sectional shape as said upwardly opening pockets, but are of slightly smaller dimensions so as to enable said projections to enter said pockets.

8. The device of claim 7 further comprising means on said variable angle cutting jig base to retain said cutting guide bar in any desired angle relative to said cutting jig base.

9. The device of claim 1 further comprising means on said cutting jig base to lock said adjustable stop block in any desired position along said cutting jig base.

10. The device of claim 2 wherein said projections have the same cross-sectional shape as said upwardly opening pockets, but are of slightly smaller dimensions so as to enable said projections to enter said pockets.

11. The device of claim 10 further comprising means on said variable angle cutting jig base to retain said cutting guide bar in any desired angle relative to said cutting jig base.

12. The device of claim 2 further comprising means on said cutting jig base to lock said adjustable stop block in any desired position along said cutting jig base.

13. A device for supporting a piece of glass while cutting same by scoring and subsequently breaking it along the score line comprising a plurality of generally vertically oriented, intersecting walls having upper and lower edges, the upper edges of the walls being coplanar so as to define a planar supporting surface for said glass piece and a generally horizontal base attached to the lower edge of each of the walls such that the walls and base form a plurality of upwardly opening pockets to catch and retain glass chips generated by the scoring and breaking process below the planar supporting surface; a variable angle cutting jig base; a yoke pivotably attached to said jig base; and a cutting guide bar engaging said yoke.

14. The device of claim 13 wherein said walls are formed of a plastic material.

15. The device of claim 14 wherein said plastic material is a styrene plastic.

16. The device of claim 13 further comprising a non-skid material attached to an exposed surface of the base.

17. The device of claim 13 wherein each of said pockets has a polygonal cross-section.

18. The device of claim 17 wherein each of said pockets has a square cross-section.

19. The device of claim 13 further comprising at least one adjustable cutting block against which the glass may be placed during the scoring operation, said cutting block having a plurality of projections on its lower surface to engage said upwardly opening pockets.

20. The device of claim 19 further comprising an adjustable arm slidably attached to said adustable cutting block, said arm being slidably adjustable in a direction generally parallel to the plane of said supporting surface, and means on said adjustable cutting block to lock said adjustable arm in a desired position.

21. The device of claim 19 wherein said projections have the same cross-sectional shape as said upwardly opening pockets, but are of slightly smaller dimensions so as to enable said projections to enter said pockets.

22. The device of claim 13 wherein the variable angle cutting jig base has a plurality of projections projecting from its lower surface to engage said upwardly opening pockets.

23. The device of claim 19 wherein said base has at least one notch in its periphery to bear against said adjustable cutting block.

* * * * *